(12) United States Patent
Judd et al.

(10) Patent No.: US 7,497,688 B1
(45) Date of Patent: Mar. 3, 2009

(54) COMPRESSED EXPERIENTIAL LEARNING

(75) Inventors: J. McKay Judd, McKinney, TX (US);
Jamie A. Biggers, Houston, TX (US);
Glen S. Finkel, St. Petersburg, FL (US);
Amanda Stephens Eyde, St. Petersburg, FL (US); Edward Samuel Deutscher, St. Petersburg, FL (US); Robert M. Calloway, McKinney, TX (US)

(73) Assignee: Accenture Global Services GmbH (CH)

( * ) Notice: Subject to any disclaimer, the term of this patent is extended or adjusted under 35 U.S.C. 154(b) by 375 days.

(21) Appl. No.: 10/245,715

(22) Filed: Sep. 18, 2002

(51) Int. Cl.
*G09B 19/00* (2006.01)
*G06F 17/60* (2006.01)
*G06F 15/18* (2006.01)

(52) U.S. Cl. .............................. 434/219; 705/11; 706/45

(58) Field of Classification Search ................. 434/219; 700/47; 705/11; 706/45
See application file for complete search history.

(56) References Cited

U.S. PATENT DOCUMENTS

| | | | | |
|---|---|---|---|---|
| 5,842,193 A * | 11/1998 | Reilly | ........................... | 706/45 |
| 6,134,539 A * | 10/2000 | O'Connor et al. | ............. | 706/45 |
| 6,149,438 A * | 11/2000 | Richard et al. | ............... | 434/322 |
| 6,157,808 A * | 12/2000 | Hollingsworth | .............. | 434/350 |
| 6,341,267 B1 * | 1/2002 | Taub | ............................ | 705/11 |
| 6,408,263 B1 * | 6/2002 | Summers | ........................ | 703/6 |
| 6,629,096 B1 * | 9/2003 | Reddy | ............................ | 707/5 |
| 6,652,287 B1 * | 11/2003 | Strub et al. | .................. | 434/365 |
| 6,739,877 B2 * | 5/2004 | Bailey et al. | ................. | 434/262 |
| 6,807,535 B2 * | 10/2004 | Goodkovsky | ................... | 706/3 |
| 7,280,991 B1 * | 10/2007 | Beams et al. | .................. | 706/46 |
| 2003/0023686 A1 * | 1/2003 | Beams et al. | ................ | 709/205 |
| 2003/0084015 A1 * | 5/2003 | Beams et al. | .................. | 706/47 |
| 2003/0086536 A1 * | 5/2003 | Salzberg et al. | ........... | 379/15.02 |
| 2003/0110067 A1 * | 6/2003 | Miller et al. | .................... | 705/8 |
| 2003/0139956 A1 * | 7/2003 | Guenther et al. | ................ | 705/7 |
| 2003/0187723 A1 * | 10/2003 | Hadden et al. | ................. | 705/11 |

OTHER PUBLICATIONS

QSI Project Management Course, May 1997, pp. 1-3.*
Bullen, Making Project Management Work, Mar. 12, 2001, Canterbury Christ Church University, Kent, UK, pp. 1-8.*

* cited by examiner

*Primary Examiner*—Robert E Pezzuto
*Assistant Examiner*—Masud Ahmed
(74) *Attorney, Agent, or Firm*—Fish & Richardson P.C.

(57) ABSTRACT

A compressed experiential learning system is created by determining high-level goals and objectives, determining roles and objectives for each role, developing a learning environment including physical and technical components, developing an instructional environment, and creating evaluation plans.

18 Claims, 19 Drawing Sheets

Target Audiences and Related Performance Objectives

| Project Roles | Performance Objectives |
|---|---|
| Project Manager | Explain differences among vendor packages.<br><br>Identify key complexities associated with specific vendor products.<br><br>Champion Accenture point of view, including basic principles and concepts.<br><br>Develop skill building programs at client (e.g., Center of Excellence).<br><br>Identify and manage change impacts and components (including transaction management and configuration management).<br><br>Articulate technical issues and risks.<br><br>Use estimating tool to develop client project estimate. |
| Process Architect | Design business objects and identify sources.<br><br>Design business processes.<br><br>Design component interaction model, enterprise data model, and data/event model. |
| Physical Environment Architect | Identify specific capabilities for vendor products from an operational perspective, such as load balancing, fail over, high availability, platform support, etc.<br><br>Identify hardware capability needs and configuration.<br><br>Install, configure, and monitor entire physical infrastructure.<br><br>Evaluate hardware, performance, scalability, server needs, and maintenance tools.<br><br>Construct development environment.<br><br>Exhibit an understanding of Disaster Recovery issues and how to plan for them on three levels: Application, Hardware, and Data. |
| Application Designer | Define specific technical interface requirements among client systems and product.<br><br>Define required test cases and scenarios for interfaces. |

FIG. 3A

Target Audiences and Related Performance Objectives
(Continued)

| Project Roles | Performance Objectives |
|---|---|
| Application Developer | Configure packaged adapters.<br><br>Develop custom adapters, translation rules, and workflows.<br><br>Develop business documents using an editor.<br><br>Conduct component and assembly testing. |
| Technology Architect | Explain differences among vendor offerings, identifying strengths and weaknesses of each.<br><br>Identify technical trends and standards in integration, including: Web services; UDDI; SOAP; XML; BPM; Opportunistic vs. systematic; and Sensors.<br><br>Identify data latency requirements, including: Real time; Near real time; and Batch.<br><br>Identify requirements regarding integration boundaries for B2B and A2A.<br><br>Identify requirements related to different integration patterns, including: Data consistency integration; Multi-step process integration; Web services; and Composite service integration.<br><br>Identify interface levels and method, including: Data level integration; API level integration; UI level integration (screen scrapers); and Method level integration.<br><br>Identify architecture improvements such as extensions for APIs to simplify developer efforts, building data extraction layers, building OS interface layers to improve system functions, and ensuring integration performance.<br><br>Given a design, select appropriate software feature and function to support: Routing; Translation; Enrichment/aggregation; Business process automation; Workflow; Adapters; and Publish/subscribe (sensor).<br><br>Design development environment.<br><br>Exhibit an understanding of Disaster Recovery issues and how to plan for them on three levels: Application, Hardware, and Data. |

FIG. 3B

Required Prerequisite Skills and Knowledge

| Project Roles | Prerequisite Skills and Knowledge |
|---|---|
| Project Manager | ■ Experienced in leading most of the tasks stated below for the Technology Architect<br>■ Experienced in leading design and development of procedures for design, development, implementation, management, and operations of systems<br>■ Experienced in leading the planning, design, and implementation of enterprise architectures<br>■ Experienced in leading the planning, design, and implementation of integration architectures (among legacy, ERP, custom, and off-the-shelf systems)<br>■ Completed the Jumpstart web-based learning and pre-reading |
| Technology Architect | ■ Experienced in planning, designing, and implementing enterprise architectures<br>■ Experienced in planning, designing, and implementing integration architectures (among legacy, ERP, custom, and off-the-shelf systems), especially Netcentric<br>■ Strong overall technology foundation, including, but not limited to:<br>    Networking (LAN, WAN, Internet, intranet)<br>    Security<br>    Servers (UNIX, NT, W2K)<br>    Email (POP3, SMTP, Exchange)<br>    Desktops/Browsers (W2K, IE, Netscape)<br>■ Experienced in at least one related software package<br>■ Completed the Jumpstart web-based learning and pre-reading |
| Process Architect | ■ Experienced in business process modeling<br>■ Experienced in design, development, and implementation of new businesses or design and implementation of improvements to existing processes<br>■ Experienced in defining business requirements<br>■ Experienced in systems integration<br>■ Completed the Jumpstart web-based learning and pre-reading |
| Physical Environment Architect | ■ Experienced in installing and configuring systems<br>■ Experienced in maintaining systems (back ups)<br>■ Strong overall technology foundation, including, but not limited to: Networking, Security, Servers, Desktops/Browsers<br>■ Completed the Jumpstart web-based learning and pre-reading |
| Application Designer | ■ Experienced in defining test cases and scenarios<br>■ Experienced with application software to be integrated<br>■ Experienced in defining technical requirements for interfaces<br>■ Experienced in software package design, development, and implementation<br>■ Experienced in life cycle development with emphasis on design phase<br>■ Experienced in technical design, development and delivery of technology solutions to address business needs<br>■ Experience with software applications to be integrated<br>■ Experience in systems integration<br>■ Completed the Jumpstart web-based learning and pre-reading |
| Application Developer | ■ Experienced in life cycle development with emphasis on coding and testing phases<br>■ Trained in component-based programming<br>■ Completed the Jumpstart web-based learning and pre-reading |

FIG. 4

Recommended Prerequisite Skills and Knowledge

| Project Roles | Prerequisite Skills and Knowledge |
|---|---|
| Project Manager | ■ Experienced in at least one related software package<br>■ Experienced in leading design and development of procedures for design, development, implementation, management, and operations of systems<br>■ Experienced in leading the planning, design, and implementation of enterprise architectures<br>■ Experienced in leading the planning, design, and implementation of integration architectures (among legacy, ERP, custom, and off-the-shelf systems)<br>■ Strong overall technology foundation, including, but not limited to: Networking (LAN, WAN, Internet, intranet); Security; Servers (UNIX, NT, W2K); Email (POP3, SMTP, Exchange); and Desktops/Browsers (W2K, IE, Netscape)<br>■ Experienced in leading design and development of middleware and messaging solutions (MQ, Tuxedo, COM/DCOM, Oracle AQ, etc.)<br>■ Experienced in leading integration of disparate systems using integration and interface architectures<br>■ Experienced in leading systems integration and interactive architecture and design<br>■ Experienced in complete life cycle development, including design, development, coding, testing, and implementing<br>■ Experienced in leading technical design, development, and delivery of technology solutions to address business needs<br>■ Experienced in leading design and development of Internet solutions (B2C, B2B, etc.)<br>■ Experienced in creating technical environment for application development teams' use<br>■ Experienced in leading installation and configuration of products<br>■ Experienced in leading ERP implementation or custom development work |
| Process Architect | ■ Experienced in business process modeling<br>■ Experienced in design, development, and implementation of new businesses or design and implementation of improvements to existing processes<br>■ Experienced in defining business requirements<br>■ Possesses product knowledge<br>■ Experienced in systems integration<br>■ Experienced in complete life cycle development, including design, development, coding, testing, and implementing |
| Physical Environment Architect | ■ Experienced in installing and configuring systems<br>■ Experienced in maintaining systems (back ups) |
| Application Designer | ■ Skilled in component-based programming<br>■ Experienced in defining technical requirements for interfaces<br>■ Experienced in defining test cases and scenarios<br>■ Possesses product knowledge<br>■ Experienced with application software to be integrated<br>■ Experienced in software package design, development, and implementation<br>■ Experienced in design and development of messaging and middleware architecture<br>■ Experienced in systems integration and interactive architecture and design<br>■ Experienced in life cycle development with emphasis on design phase<br>■ Experienced in technical design, development and delivery of technology solutions to address business needs |
| Application Developer | ■ Trained in component-based programming<br>■ Possesses product knowledge<br>■ Experienced in software package design, development, and implementation<br>■ Experienced in systems integration and user interface design<br>■ Experienced in life cycle development with emphasis on coding and testing phases |

FIG. 5A

Recommended Prerequisite Skills and Knowledge
(Continued)

| Project Roles | Prerequisite Skills and Knowledge |
|---|---|
| Technology Architect | <ul><li>Experienced in at least one related software package</li><li>Experienced in designing and developing procedures for design, development, implementation, management, and operations of systems</li><li>Experienced in planning, designing, and implementing enterprise architectures</li><li>Experienced in planning, designing, and implementing integration architectures (among legacy, ERP, custom, and off-the-shelf systems), especially Netcentric</li><li>Experienced in design and development of messaging and middleware architecture</li><li>Strong overall technology foundation, including, but not limited to:</li><li>Networking (LAN, WAN, Internet, intranet)</li><li>Security</li><li>Servers (UNIX, NT, W2K)</li><li>Email (POP3, SMTP, Exchange)</li><li>Desktops/Browsers (W2K, IE, Netscape)</li><li>Experienced in design and development of middleware and messaging solutions (MQ, Tuxedo, COM/DCOM, Oracle AQ, etc.)</li><li>Experienced in integrating disparate systems using integration and interface architectures</li><li>Experienced in systems integration and interactive architecture and design</li><li>Experienced in complete life cycle development, including design, development, coding, testing, and implementing</li><li>Experienced in technical design, development, and delivery of technology solutions to address business needs</li><li>Experienced in design and development of Internet solutions (B2C, B2B, etc.)</li><li>Experienced in creating technical environment for application development teams' use</li><li>Experienced in installing and configuring products</li><li>Experienced in implementing ERP solutions or custom development work</li><li>Skilled in component-based programming</li><li>Experienced in defining technical requirements for interfaces</li><li>Experienced in defining test cases and scenarios</li><li>Possesses product knowledge</li><li>Experienced with application software to be integrated</li><li>Experienced in software package design, development, and implementation</li><li>Experienced in design and development of messaging and middleware architecture</li><li>Experienced in systems integration and interactive architecture and design</li><li>Experienced in life cycle development with emphasis on design phase</li><li>Experienced in technical design, development and delivery of technology solutions to address business needs</li></ul> |

FIG. 5B

Performance Objectives Matrix

| Role | Objective | | | | |
|---|---|---|---|---|---|
| Project Manager | Explain differences among vendor packages | x | | | |
| | Identify key complexities associated with specific vendor products | x | | | |
| | Articulate Accenture point of view, including basic principles and concepts | x | | | |
| | Develop skill building programs at client (e.g., Center of Excellence) | x | | | x |
| | Identify and manage change impacts and components (including transaction management and configuration management) | | Week 2, Day 1 | | x |
| | Articulate technical issues and risks | | | | x |
| | Use estimating tool to develop client project estimate | | Deliver Estimate & Workplan - Week 1, Day 5 | | x |
| Technology Architect | Explain differences among vendor offerings, identifying strengths and weaknesses of each | x | | | |
| | Identify technical trends and standards in integration, including: Web services, UDDI, SOAP, XML, BPM, Opportunistic vs. systematic, Sensors | x | Speaker - Week 1, Day 2 | | |
| | Identify data latency requirements, including, Real time, Near real time, Batch | x | | | |
| | Identify requirements regarding integration boundaries for B2B and A2A | x | | | |
| | Identify requirements related to different integration patterns, including data consistency integration, multi-step process integration, and web services, composite service integration | | Speaker - Week 1, Day 2 | | x |
| | Identify interface levels and method, including data level integration, API level integration, UI level integration (screen scrapers) | | Class Discussion - Week 1, Day 4 | | x |
| | Identify architecture improvements such as extensions for APIs to simplify developer efforts, building data extraction layers, building OS interface layers to improve system functions, and ensuring integration performance | | Build and configure interface architecture components (Tech, Arch, Arch Developer, Phys Arch) - Week 3, Day 1 Complete | | x |
| | Given a design, select appropriate software feature and function to support: routing, translation, enrichment/aggregation, business process automation, workflow, adapters, publish/subscribe (sensor) | x | | | |
| | Design development environment | | Environment Setup Approach - Week 1, Day 2 | | x |
| | Demonstrate an understanding of Disaster Recovery issues and how to plan for them on three levels: Application, Hardware, and Data | | Complete Operations Architecture Design - Week 3, Day 4 | | x |
| Process Architect | Design business objects and identify sources | | Requirements/Interviews | | |
| | Design business processes | x | Design EAI business processes and define business rules - Week 1, Day 2 | | x |
| | Design component interaction model, enterprise data model, and data/event model | x | | | |

FIG. 7A

Performance Objectives Matrix

| | | | | |
|---|---|---|---|---|
| Physical Environment Architect | Identify specific capabilities for vendor products from an operational perspective, such as load balancing, fail over, high availability, platform support, etc. | | X | |
| | Identify hardware capability needs and configuration | | | X — Week 1, Day 2 |
| | Install, configure, and monitor entire physical infrastructure | | | X — Week 1, Day 2 |
| | Evaluate hardware, performance, scalability, server needs, and maintenance tools | | | X — Week 1, Day 2 |
| | Construct development environment | | | Environment Setup - Week 1, Day 2 |
| | Display an understanding of Disaster Recovery issues and how to plan for them on three levels: Application, Hardware, and Data | | | X — Complete Operations Architecture Design - Week 3, Day 4 |
| | Display an understanding of Capacity Planning for environment support systems | | | Write Capacity Plan - Week 2, Day 1 |
| Application Designer | Define specific technical interface requirements among client systems and product | | X | |
| | Define required test cases and scenarios for interfaces | | | X — Test Plan & Approach - Week 2, Day 1 |
| Application Developer | Configure packaged adapters | | | X — Develop interfaces - Weeks 2 and 3 |
| | Develop custom adapters, translation rules, and workflows | | | X — Develop interfaces - Weeks 2 and 3 |
| | Develop business documents using a software editor | | | Develop interfaces - Weeks 2 and 3 |
| | Conduct component and assembly testing | | | X — Component Tests - Weeks 2 & 3; Assembly Tests - Week 3, Day 3 |

FIG. 7B

| Week One Day One | |
|---|---|
| Activities | Introductions, Housekeeping, Ice Breaker<br>Overview and Concepts- Interactive Game<br>Self-Assessment Overview<br>Introduction to Scenario and Requirements<br>Project Kick-off/Team Meeting and Planning/Role Assignments<br>Interface Conceptual Design for Prototype<br>Determine Requirements for Prototype<br>Begin Approach and Design documents- Prototype Interface |

FIG. 8A

| Week One Day Two | |
|---|---|
| Related Performance Objectives | Identify hardware capability needs and configuration<br>Install, configure, and monitor entire physical infrastructure<br>Design development environment<br>Construct development environment<br>Use estimating tool to develop client project estimate<br>Design business processes and define business rules<br>Evaluate hardware, performance, scalability, server needs, and maintenance tools<br>Identify technical trends and standards in integration (Speaker)<br>Identify requirements related to different integration patterns (Speaker) |
| Activities | Begin Prototype Interface<br>Environment Setup Approach (Physical Arch and Tech Arch)<br>Set Up Environment (Physical Arch and Tech Arch)<br>Begin Estimate and Workplan Full-Scale (Project Manager)<br>Process Flows with Business Rules for Prototype (Process Arch and Designer)<br>Begin Testing the Environment (Application Designer and Developer)<br>Begin reviewing and researching reference materials (Application Developer)<br>Practice on vendor software tool (Application Developer)<br>Guest Speaker with Q & A<br>Status Meeting, Coaches Feedback to class, Project Manager feedback to team<br>Deliverables<br>Environment Set-up Approach Document<br>Process Flows with Business Rules for Prototype Interface<br>Conceptual Design- Prototype<br>Requirements- Prototype |

FIG. 8B

| Week One Day Three | |
|---|---|
| Related Performance Objectives | Design Development Environment<br>Construct Development Environment<br>Monitor physical infrastructure |
| Activities | Confirm set up of environment<br>Vendor Guest Speaker/Expert, Discuss overview, demo of selected product<br>Design Prototype Interface (All)<br>Continue Estimate and Workplan- Full-Scale (Project Manager)<br>Write Roles and Responsibilities (Project Manager)<br>Create Skills Approach (Project Manager)<br>Process Flows and Business Rules- Full-Scale (Process Arch)<br>Practice on vendor product (All)<br>Develop Prototype Interface (All)<br>Status and Feedback Session<br>Deliverables<br>Prototype Interface Design<br>Roles and Responsibilities<br>Skills Approach<br>Sign-off<br>Prototype Interface Design<br>Prototype Process Flow with Business Rules |

FIG. 8C

| Week One Day Four | |
|---|---|
| Related Performance Objectives | Identify interface levels and methods, including: Data level integration, API level integration, UI level integration |
| Activities | Complete Development and Testing of Prototype Interface (All)<br>Present to Coach/Client for sign-off<br>Continue Process Flows- Full-Scale (Process Arch)<br>Continue Estimate and Workplan- Full-Scale (Project Manager)<br>Group Discussion- Interface Methods and Levels<br>Client Meeting/Status Meeting and Feedback<br>Deliverables<br>Prototype Interface<br>Sign-off<br>Prototype Interface |

FIG. 8D

| Week One Day Five | |
|---|---|
| Related Performance Objectives | Define Specific interface requirements<br>Identify hardware capability needs and configuration |
| Activities | Prototype Interface Review<br>Group Discussion- Lessons Learned<br>Begin Full-Scale Integration Planning and Development<br>Planning Session (All)<br>Practice on vendor product (Application Developer)<br>Design Development Architecture (Tech Arch and Physical Arch)<br>Begin Interface Design (Application Designer and Developer)<br>Complete Process Flows and Business Rules (Process Arch)<br>Complete Estimate and Workplan- Full-Scale (Project Manager)<br>Demonstration of Applications Activity (All)<br>Status Meeting and Feedback<br>Deliverables<br>Development Architecture Design<br>Estimate and Workplan<br>First Draft of Process Flows complete<br>Testing Approach<br>Sign-off<br>Development Architecture Design<br>Estimate and Workplan |

FIG. 8E

| Week Two Day One | |
|---|---|
| Related Performance Objectives | Define required test cases and scenarios for interfaces<br>Identify and manage change impacts and components (including transaction management and configuration management)<br>Given a design, select appropriate software feature and function to support<br>Display an understanding of Capacity Planning for environment support systems |
| Activities | Continue Interface Design (Application Designer and Developer)<br>Design Interface Architecture- adaptors, translation, standards (Tech Arch and Physical Arch)<br>Test Plans and Testing Approach (Process Arch)<br>Write Capacity Plan (Physical Arch)<br>Project Risk Assessment and Issue Resolution (Project Manager)<br>Change Management Approach (Project Manager)<br>Group Activity<br>Status Meeting and Feedback<br>Deliverables<br>Adaptor Topology<br>Project Risk Assessment and Issue Resolution Document<br>Change Management Approach Document<br>Capacity Plan- Outline<br>Final Process Flows<br>Sign-off<br>Adaptor Topology<br>Process Flows (includes changes) |

FIG. 9A

| Week Two Day Two | |
|---|---|
| Related Performance Objectives | Develop customer adaptors, translation rules, and workflows |
| Activities | Begin Development (Application Developer)<br>Continue Issue and Status Management (Project Manager)<br>Continue Interface Design (Application Designer)<br>Complete Interface Architecture Design (Tech Arch and Physical Arch)<br>Continue Developing Interfaces (Application Developer)<br>Continue Test Planning (Process Architect)<br>Complete Testing Approach<br>Status Meeting and Feedback<br>Deliverables<br>Developer's Guide<br>Interface Architecture Design<br>Testing Approach<br>Sign-off<br>Interface Architecture Design |

FIG. 9B

| Week Two Day Three | |
|---|---|
| Related Performance Objectives | Configure packaged adaptors |
| Activities | Build and Configure Interface Architecture Components (Tech, Arch, Arch Developer, Phys Arch)<br>Continue Interface Design (Application Designer)<br>Continue Developing Interfaces (Application Developer)<br>Complete Test Plan (Process Arch)<br>Stress Reliever Activity (All)<br>Status Meeting and Feedback<br>Deliverables<br>Test Plan<br>Sign-off<br>Test Plan |

FIG. 9C

| Week Two Day Four | |
|---|---|
| Related Performance Objectives- | Conduct Component Testing<br>Identify architecture improvements such as extensions for APIs to simplify developer efforts, building data extraction layers, building OS interface layers to improve system functions, and ensuring integration performance |
| Activities | Continue Building and Configuring Interface Architecture Components (Tech, Arch, Arch Developer, Phys Arch)<br>Continue Developing Interfaces (Application Developer)<br>Complete Interface Design (Application Designer)<br>Deliver First Interface to Client<br>Component Test First Interface<br>Group Activity<br>Status Meeting and Feedback<br>Deliverable<br>First Interface Component Test Results<br>Interface Design<br>Sign-off<br>Interface Design |

FIG. 9D

| Week Two Day Five | |
|---|---|
| Related Performance Objectives | Configure Packaged adaptors |
| Activities | Continue Building and Configuring Interface Architecture Components (Tech, Arch, Arch Developer, Phys Arch)<br>Continue Developing Interfaces<br>Deliver Second Interface<br>Component Test Second Interface to Client<br>Status Meeting and Feedback<br>Deliverable<br>Second Interface Component Test Results |

FIG. 9E

| Week Three Day One | |
|---|---|
| Related Performance Objectives | Conduct Assembly Test |
| Activities | Review of week one and week two<br>Complete All Interface Architecture Components (Tech Arch, Arch Developer, Phys Arch)<br>Continue Developing Interfaces<br>Deliver Third Interface to Client<br>Component Test Third Interface<br>Assembly Test First Three Interfaces<br>Status Meeting and Feedback<br>Deliverables<br>Interface Architecture Components<br>Third Interface Component Test Results<br>Assembly Test Results |

FIG. 10A

| Week Three Day Two | |
|---|---|
| Related Performance Objectives | Conduct Component Test |
| Activities | Continue Developing Interfaces<br>Deliver Fourth and Fifth Interfaces to Client<br>Component Test Fourth and Fifth Interfaces<br>Support Build Effort (Architects)<br>Group Activity<br>Status Meeting and Feedback Status Meeting and Feedback<br>Deliverables<br>Fourth and Fifth Interfaces Component Test Results |

FIG. 10B

| Week Three Day Three | |
|---|---|
| Related Performance Objectives | Conduct Assembly Test |
| Activities | Design Operations Architecture (Tech Arch, Arch Developer, Phys Arch)<br>Fixit Work<br>Assembly Test –All Interfaces<br>Support Build Effort (Architects)<br>Status Meeting and Feedback<br>Deliverables<br>Assembly Test Results<br>Sign-off<br>Assembly Test sign-off |

FIG. 10C

| Week Three Day Four | |
|---|---|
| Related Performance Objectives | Display an understanding of Disaster Recovery issues and how to plan for them on three levels: Application, Hardware, and Data |
| Activities | Prepare for delivery to client<br>Product Test with client (Application Designer and Developer)<br>Complete Operations Architecture Design- disaster recovery and system monitoring (Tech Arch, Arch Developer, Phys Arch)<br>Status Meeting and Feedback<br>Deliverables<br>Operations Architecture Design<br>System Monitoring Approach<br>Product Test Results<br>Sign-off<br>Product Test client sign-off<br>Operations Architecture Design |

FIG. 10D

| Week Three Day Five | |
|---|---|
| Related Performance Objectives | |
| Activities | Deliver to client<br>Final sign-off on project<br>Closing on entire experience<br>Discussion of Alternatives<br>Feedback |

FIG. 10E

COMPRESSED EXPERIENTIAL LEARNING

TECHNICAL FIELD

This disclosure is directed to a training system, and more particularly, to a role-based, scenario-based training system that rapidly imparts experience.

BACKGROUND

In any area of technology experiencing rapid growth, the demand for skilled labor may outpace the labor market's supply. As the complexity of technology or processes increases, the demands for experienced labor quickly may surpass the supply. Many techniques are available to impart knowledge necessary to train an employee. These techniques include web-based learning systems, technical courses, case studies, textbooks, and lectures. While these techniques often are effective in imparting knowledge, they generally are unable to provide experience.

For example, enterprise application integration (EAI) is a technology and business process that enables companies to dramatically change the way they do business by providing a common framework to integrate end-to-end business process, workflows, and data across disparate applications, and thereby increase a company's ability to respond and adapt to change. In implementing EAI solutions, companies are interested in engaging experienced teams to rapidly deploy systems that integrate various, and often disparate, systems within a single EAI framework.

SUMMARY

In a general aspect, creating a compressed experiential learning system to jumpstart a team includes determining high-level goals and objectives for a team to be accomplished by the compressed experiential learning system, determining roles for the team members, determining performance objectives for each role, developing a learning environment including physical and technical components, developing an instructional environment, and creating evaluation plans to measure the progress and success of the compressed experiential learning system. The compressed experiential learning system may be used to jumpstart a team to perform a team activity such as, for example, to perform an enterprise application integration client engagement.

Developing a learning environment may include defining the hardware systems and software systems needed for the compressed experiential learning event. The instructional environment may be defined by creating a performance objective matrix, and using the performance objective matrix to define activities designed to meet the determined performance objectives for each role. The performance objective matrix may be implemented as a spreadsheet including a role column with at least one row for each role, a performance objective column including objectives corresponding to roles in the role column, and an activity column identifying activities to be performed in the compressed experiential learning system to meet a corresponding performance objective.

Additionally, the performance objective matrix may further include a pre-read column that indicates whether a corresponding performance objective may be met through a pre-reading assignment, and an other material column that indicates whether a corresponding performance objective may be met through an assignment of other material such as, for example, a web-based learning assignment.

The details of one or more implementations are set forth in the accompanying drawings and the description below. Other features will be apparent from the description and drawings, and from the claims.

DESCRIPTION OF DRAWINGS

FIGS. 3A and 3B list exemplary performance objectives for participant roles in a compressed experiential learning system.

FIG. 4 is a table listing exemplary prerequisite skills and knowledge for participant roles.

FIGS. 5A and 5B are tables listing exemplary suggested skills and knowledge for participant roles.

FIGS. 7A and 7B are spreadsheets used to match performance objectives with learning activities.

FIGS. 8A-8E list activities for a first week of a compressed experiential learning system.

FIGS. 9A-9E list activities for a second week of a compressed experiential learning system.

FIGS. 10A-10E list activities for a third week of a compressed experiential learning system.

DETAILED DESCRIPTION

Figure 1:
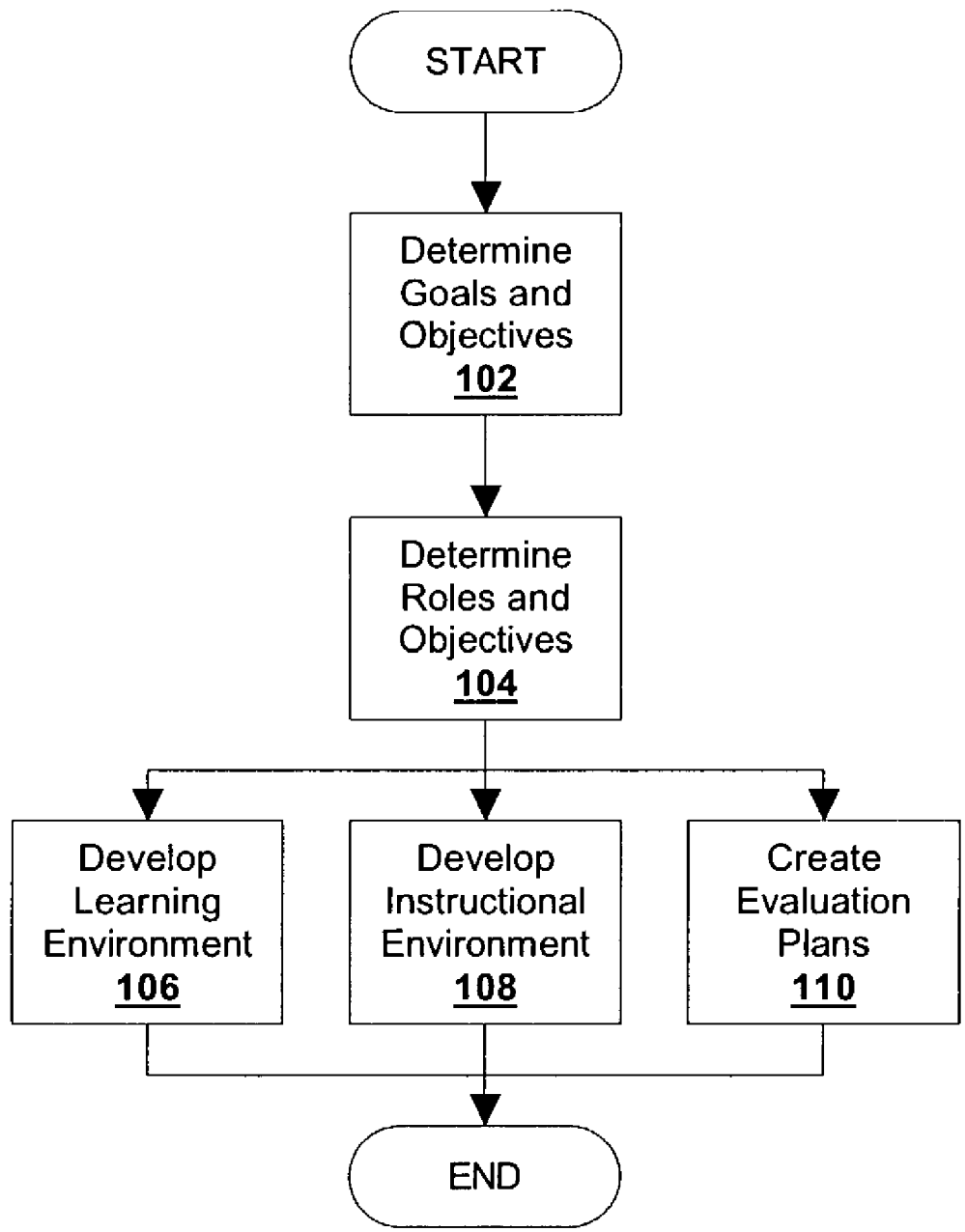
FIG. 1 is a flow chart of a method of creating a compressed experiential learning system.

Referring to FIG. 1, a team may acquire experience using a new technique that may be referred to as compressed experiential learning. Using this technique, a team may acquire, in few weeks, the equivalent of a much longer period of actual experience. For example, some programs may provide the equivalent of approximately six months experience in only a few weeks. To create a compressed experiential learning program, a program developer begins by determining the high-level goals to be accomplished by a team (step 102). For example, the highest-level goal may be to jumpstart a team so that members of the team can work together to perform a particular function. The high-level goals include the overall goals that a team needs to accomplish, such as educating a customer, describing the risks and benefits of different designs, designing a solution to a customer's problem, and documenting and implementing the solution.

To meet the high-level goals, the program developer establishes roles and determines objectives for each role (step 104). Instead of focusing on individuals, compressed experiential learning takes a team approach, that allows team members to learn how to interact with one another to address complex problems. To facilitate experience-building, the program developer provides a learning environment (step 106) that provides a realistic setting. The exemplary environment includes both technical components and physical components. For example, the technical components may include a computer network with a server and several clients modeling a real-world system. Physical components typically model the workplace, in which the team will be expected to perform the skills they acquire and may include, for example, office layout, furniture, and equipment.

In addition to the learning environment, the program developer defines an instructional environment (step 108) that defines the instructional activities that may be employed to reach the given roles and objectives. A performance objective matrix may be used to develop the instructional environment.

The performance objective matrix includes an identification of project role, the performance objectives for each project role, and a time frame for the objectives to be met. This facilitates the design and creation of activities to meet the determined goals for each role.

To determine whether goals are being met, the program developer creates evaluation plans (step 110). These evaluation plans may be used to provide feedback to participants, to identify when additional learning activities may be needed to reach a goal, and to measure the success of the program. A team member participates in compressed experiential learning by performing the activities and producing the deliverables defined by the program. At various points, the performance of individual members and/or the team as a whole are evaluated as determined in step 110 to determine if additional learning techniques are needed or other modification to the instructional environment determined in step 108 are needed to meet the high-level goals defined in step 102.

In an exemplary implementation of a compressed experiential learning program as described in FIG. 1, an engagement team is given the knowledge and experience necessary for enterprise application integration. The program is designed to create a supportive learning environment for team members of the engagement team. This learning environment provides the knowledge and tools to allow performance at optimal levels early in a client engagement. The program includes a technology component and a business simulation component to present a learning event, and culminates in a dry run to evaluate the success of the event.

Program development begins by determining the high-level goals (step 102). The overall learning goal of the program is to jumpstart the members of an engagement team on their project knowledge, methods, applications, and team dynamics. The purpose of this is to allow the team to perform at high levels early in the project lifecycle.

The program incorporates a blended instructional approach with web-based learning, pre-reading, and business simulation to allow the participants to demonstrate the needed understanding of concepts and the skills necessary to perform more effectively on a project. The web-based learning and pre-read materials focus on concepts. The materials include approximately 24 to 32 hours of pre-reading with several virtual meetings to gauge understanding and allow for questions.

This learning goal allows the learning event project team to begin the design and development of client requirements and scenarios in a three-week period allotted for the program. The instructional environment includes a three-week business simulation to bring the entire team together on a project. The team interacts with a mock client, and is expected to deliver the client requirements throughout the event. At the start of the event, the learning goals are to use the pre-study materials and each team member's prior knowledge to effectively begin the project. During the event, the goal is for the team members to demonstrate an understanding of the concepts and to exhibit the skills needed to deliver quality project deliverables.

Figure 2:
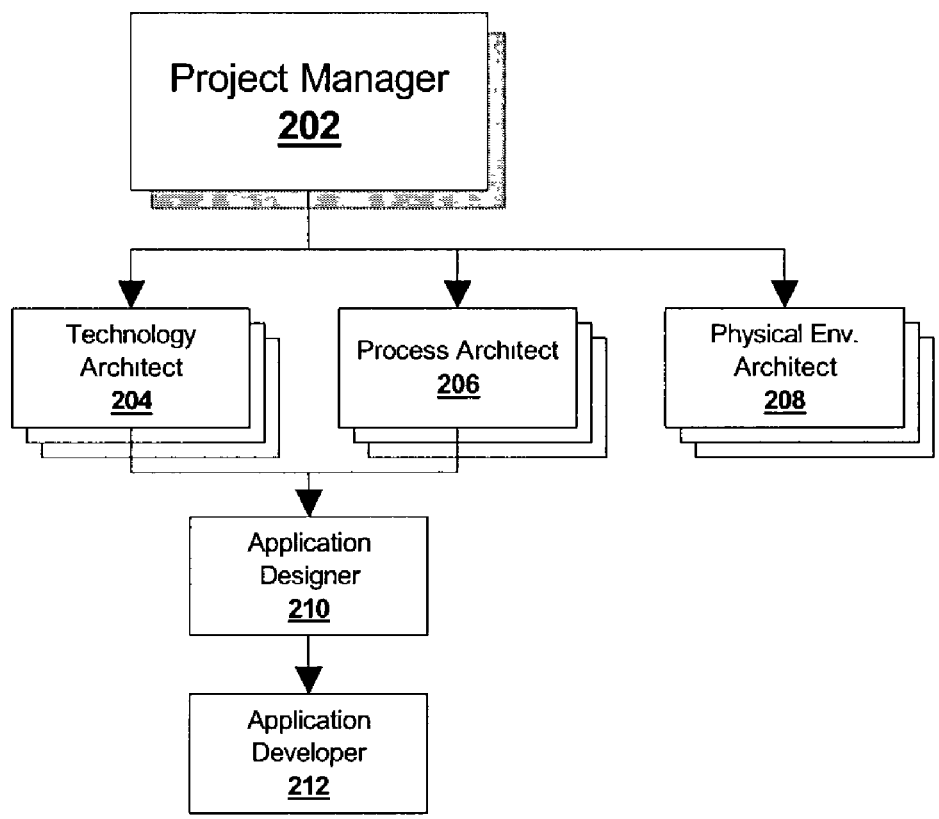
FIG. 2 is an organizational chart of an engagement team to perform enterprise application integration.

After the high-level objectives are defined, the various roles and objectives for each role may be determined (step 104). In this implementation, the following roles are used as shown in FIG. 2: project manager 202, technology architect 204, process architect 206, physical environment architect 208, application designer 210, and application developer 212. The roles are selected for the particular domain and may differ greatly from roles selected for another domain.

The project manager 202 is ultimately responsible for client interaction. For example, in a typical engagement, the project manager 202 may be asked to create a client project plan and estimate, draft a skill building approach document, perform a project risk assessment and create an issue resolution document, draft a change management approach document, and create status reports. The technology architect 204 is responsible for drafting a conceptual design document, drafting a development architecture approach document, performing an architectural gap analysis, and determining design improvements for architecture extensions. The process architect 206 creates enterprise-level business object and process designs. The physical environment architect 208 is responsible for the physical and logical topology, capacity planning, creating a working development environment, and configuring a working system. The application designer 210 drafts a detailed design document and creates test plans. Finally, the application developer 212 is responsible for creating working adaptors and components, defining a valid XML schema, and producing test results.

Using information, such as the responsibilities of each role, a learning program developer can define performance objectives for each role. FIGS. 3A and 3B identify objectives for each role that may be chosen for the engagement team based on the high-level goals identified in step 102. For example, the project manager 202 is given the ultimate responsibility for the team's performance in the client engagement. To properly manage the team, the project manager 202 should be able to meet defined objectives, such as, for example, explaining the technology that will be employed and describing the risks and benefits involved.

In order to learn the skills and acquire the knowledge necessary to meet the objectives of the compressed experiential learning program, it is helpful for participants to begin the program with a basic skill set and experience level based on the roles they are to carry out. For example, the job of the project manager 202 typically demands a higher prerequisite skill set than that of the application developer 212.

Referring to FIG. 4, the project manager 202 should have the following skills before entering the compressed experiential learning program: (1) experience in leading most of the tasks and duties of technology architect 204; (2) experience in leading design and development of procedures for design, development, implementation, management, and operations of systems; (3) experience in leading the planning, design, and implementation of enterprise architectures; and (4) experienced in leading the planning, design, and implementation of integration architectures (among legacy, ERP, custom, and off-the-shelf systems).

In addition, the program developer may identify recommended prerequisite skills for each position. These would not be mandatory. However, they could have significant impact on the success of individuals in fulfilling their roles and the success of the team as a whole. For example, the project manager 202 would benefit by having the following skills and experiences: (1) experience in leading most of the technology architect 204 tasks; (2) experience in leading design and development of procedures for design, development, implementation, management, and operations of systems; (3) experience in leading the planning, design, and implementation of enterprise architectures; and (4) experience in leading the planning, design, and implementation of integration architectures (among legacy, ERP, custom, and off-the-shelf systems).

The technology architect 204 is responsible for determining the technical requirements and design for the client engagement. To properly perform this responsibility, the technology architect 204 should be able to meet the following objectives: (1) explain differences among vendor offerings, identifying strengths and weaknesses of each; (2) identify technical trends and standards in integration; (3) identify data latency requirements; (4) identify requirements regarding integration boundaries; (5) identify requirements related to different integration patterns; (6) identify user interface levels and methods; (7) identify architecture improvements, such as extensions for application programming interfaces (APIs) to simplify developer efforts in building data extraction layers, building operating system (OS) interface layers to improve system performance, and ensuring integration performance; (8) select the appropriate software feature and function for a given design; (9) design a development environment; and (10) exhibit an understanding of disaster recovery issues and how to plan for them on the application, hardware, and data levels.

To meet these objectives, the technology architect 204 should have the following skills before entering the compressed experiential learning program: (1) experience in planning, designing, and implementing enterprise architectures; (2) experience in planning, designing, and implementing integration architectures (among legacy, ERP, custom, and off-the-shelf systems); (3) strong overall technology foundation, including, but not limited to, networking (LAN, WAN, Internet, intranet), security, servers (Unix, Windows NT, Windows 2000), email, and desktops/browsers (e.g., Windows 2000, Internet Explorer, and Netscape); and (4) experience in at least one related software package.

The process architect 206 is responsible for determining business process requirements and for ensuring that the client engagement project will operate with existing business processes. To carry out these responsibilities, the process architect 206 should be able to meet the following objectives: (1) design business objects and identify sources; (2) design business processes; and (3) design component interaction models, enterprise data models, and data/event models.

The physical environment architect 208 is responsible for designing, configuring, and implementing the physical infrastructure of the system. To meet this responsibility, the physical environment architect 208 should be able to complete the following objectives: (1) identify specific capabilities for vendor products from an operational perspective, such as load balancing, fail over, high availability, and platform support; (2) identify hardware capability needs and configuration; (3) install, configure, and monitor entire physical infrastructure; (4) evaluate hardware, performance, scalability, server needs, and maintenance tools; (5) construct development environment; and (6) exhibit an understanding of disaster recovery issues and how to plan for them on the application, hardware, and data levels.

Application designer 210 is responsible for designing a system for implementation by application developer 212. To meet this responsibility, application designer 210 should be able to meet the following objectives: (1) define technical interface requirements among client systems and products; and (2) define test cases and scenarios for interfaces.

Finally, application developer 212 is responsible for implementing the design. To be able to meet this responsibility, application developer 212 should be able to meet the following objectives: (1) configure packaged adapters; (2) develop custom adaptors, translation rules, and workflows; (3) develop business documents using an editor; and (4) conduct component and assembly testing.

In addition to the prerequisite skills and knowledge identified for each role, a learning program developer may define certain recommended skills and knowledge. FIGS. 5A and 5B identify recommended prerequisite skills and knowledge that assist participants in reaching their goals in a learning event.

For example, the project manager 202 would benefit by having experiences in all aspects of the team's work. This skill is not mandatory and is not needed to be successful; however, the more experience the project manager has, the better he or she is able to advise customers and supervise the members of the engagement team.

Using the roles and objectives identified above, the program developer defines the learning environment (step 106). The learning environment includes both a technical and a physical component.

Figure 6:
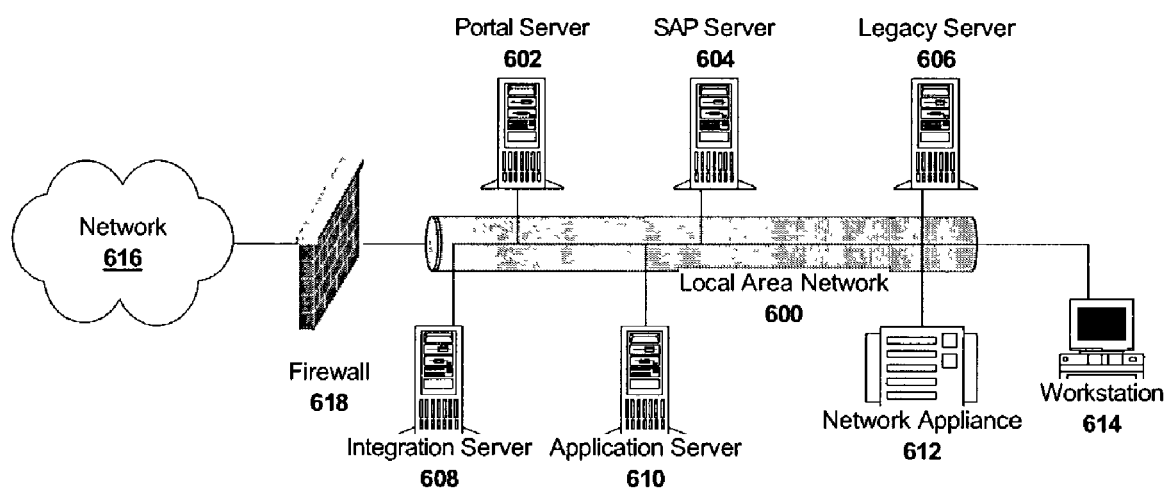
FIG. 6 is a network diagram of the technical components in an exemplary learning system.

Referring to FIG. 6, the technical components of the learning environment are chosen to be representative of those the engagement team may encounter in real customer engagements. For example, in an enterprise application integration engagement, the engagement team may be asked to integrate various existing applications deployed by a customer. Any technical environment suitable for scenario-based enterprise application integration may be used. For example, the technical components of a learning environment may include a local area network 600 connecting various servers and workstations such as, for example, a portal server 600, a SAP server 604, a legacy server 606, an integration server 608, an application server 610, a network appliance 612, and a workstation 614. The local area network 602 is connected to a network 616 (e.g., the Internet, a dial-in network, or a wide-area network) through a firewall 618. This architecture provides a training lab that closely resembles a heterogeneous environment that may be found at a client site.

The servers may be implemented using computer systems such as, for example, the systems listed in Table 1.

TABLE 1

| | |
|---|---|
| Portal Server 602 | Compaq Deskpro having: |
| | 500 MHz processor |
| | 6 GB disk space |
| | 128 MB RAM |
| SAP Server 604 | Dell Poweredge 350 having: |
| | 750 MHz Pentium III |
| | 18 GB disk space |
| | 1 GB RAM |
| Legacy Server 606 | Hewlett Packard L-Class server having: |
| | 360 MHz PA-RISC processor |
| | 73 GB disk space |
| | 256 MB RAM |
| Integration Server 608 | Sun Microsystems Netra T1 AC200 having: |
| | 500 MHz UltraSPARC processor |
| | 2 × 36 GB disk space |
| | 256 MB RAM |
| Application Server 610 | Dell Poweredge 350 having: |
| | 750 MHz Pentium III |
| | 18 GB disk space |
| | 1 GB RAM |
| Network Appliance 612 | EMC Network Storage Appliance |
| Workstation 614 | Windows 2000 workstation having: |
| | 500 MHz Pentium III |
| | 18 GB disk space |
| | 256 MB RAM |

Each of the servers may use disk space provided by network appliance 612 if the locally configured disk space proves inadequate.

The portal server 602 includes a web application for entering new customer information and orders. In addition, a business-to-business (B2B) stub may be used to simulate B2B transactions. The web applications are provided using a web server such as Microsoft Internet Information Server (IIS) 5.0. Additionally, the portal server 602 may include applications such as, for example, Internet Explorer 5.01, FND 4.0 Client, and AGS applications.

The SAP server 604 includes SAP R/3 4.6C software for Windows 2000. The SAP R/3 implementation uses a database and runs on a Windows 2000 Advanced Server operating system. The legacy server 606 runs the HP/UX 11.0 operating system and the Oracle 8.1.6 database. The integration server 608 may be implemented using any enterprise application integration software package such as, for example, SeeBeyond e*Gate Integrator 4.5.

The workstation 614 may be configured with the software including Windows 2000, Service Pack 2, Internet Explorer 5.01, Adobe Acrobat Reader 3.0, Exceed 6.1, Java 1.1.8, SeeBeyond e*Gate 4.5, SAP R/3 GUI 4.6C, SAP R/3 DCOM Connector Release 4.6C, Oracle 8 Client, ODBC driver, Siebel Client, Lodestar Client, Microsoft Access and Text ODBC Drivers, Microsoft Office 2000, Visual Studio 6.0, Visual Source Safe 6.0, and Customer/1 Developer Seed.

The technical components of the learning environment may be set up so that the performance and operation of the components may be monitored. BMC Patrol software may be installed on application servers and configured to notify the appropriate technical operations personnel of impending performance issues and/or server failures. Using BMC Patrol software, proactive monitoring of resource usage can reduce or prevent unnecessary outages.

The physical components of the learning environment are chosen to model working conditions that may be experienced in actual client engagements. For example, the project manager 202 may be given an office while the other members of the engagement team may be given cubicles in which to work. The learning environment should allow each team member space to independently perform his or her defined objectives in a scenario similar to that the team member will encounter in practice.

Referring to FIGS. 7A and 7B, the instructional environment may be defined and developed (step 108) while the learning environment is defined (step 106). A performance objective matrix is a spreadsheet that may be used to define learning events to meet each performance objective. The spreadsheet includes columns identifying the project roles and corresponding performance objectives such as those shown in FIGS. 3A and 3B. In addition, the spreadsheet includes one or more columns indicating when and how each performance objective will be met in a learning event. For example, the performance objective matrix shown in FIGS. 7A and 7B includes three columns used to indicate whether each performance objective is met through pre-assigned reading, through a learning event activity, or through other materials (e.g., web-based learning). This spreadsheet assists a compressed experiential learning system developer to plan a learning event that will meet the defined performance objectives.

Referring to FIGS. 8A-8E, 9A-9E, and 10A-10E, the learning event schedule is developed using the performance objective matrix as shown in FIGS. 7A and 7B. The schedule includes a wide variety of learning events. For example, on the first day, the learning event begins with introductions, housekeeping announcements, and one or more ice breakers. A group facilitator or speaker then gives an overview of the learning event, and identifies the concepts that will be covered. Each participant will have the opportunity to perform a self-assessment to help determine a baseline to later gauge the success of the program. The program continues with an introduction to the scenario and requirements. Then, the participants join a project kick-off/team meeting and are given their role assignments. The activities continue as shown in FIG. 8A.

Each day, activities are selected that use various learning techniques to assist participants in meeting their performance objectives. FIGS. 8A-8E, 9A-9E, and 10A-10E describe activities for a three-week program.

As participants complete the various activities within a learning event, it is useful to gauge the success of each participant in meeting his or her performance objectives. Evaluation plans are created (step 110) and are integral to the learning program so that facilitators may monitor the success of the program throughout a learning event. This allows changes to be made and additional, reinforcement or remedial learning activities to be assigned to participants to help assure the team's success. For example, on day two of week two (FIG. 8B), the team participates in a status meeting. At that time, the status may be evaluated to determine whether the application designer 210 is on track with the interface design. The evaluation plans are carefully planned to monitor individuals throughout the program to provide appropriate feedback and to maintain the team's progression to meeting the performance objectives.

This compressed experiential learning system may provide an inexperienced team with the equivalent of sufficient experience to effectively carry out a successful enterprise application integration client engagement.

A number of implementations have been described. Nevertheless, it will be understood that various modifications may be made without departing from the spirit and scope of the invention. Accordingly, other implementations are within the scope of the following claims.

What is claimed is:

1. A method for creating a training program that is to be administered to a team of employees before the team of employees performs a service for a customer at the customer's workplace and that is intended to provide the team of employees with training that is useful for preparing the team of employees to perform the service for, the customer at the customer's workplace, the method comprising:

determining high-level goals specifically for the training program, the specific high-level goals representing goals to be accomplished by the team of employees during the training program in order to acquire experience to perform the service for the customer in a compressed time period that is shorter than a time period in which the experience is acquired without using the training program;

determining roles for the team of employees specifically for the training program, wherein:

each role is to be performed by a member of the team of employees during the training program in order to accomplish one or more of the high-level goals for the training program, and each role corresponds to a position to be filled while performing the service for the customer;

for each role, determining performance objectives specifically for the training program to be completed by the role during the training program in order to accomplish one or more corresponding high-level goals;

based on the high-level goals determined specifically for the training program and the roles for the team of employees determined specifically for the training program, creating a learning environment specifically for the training program and within which at least a portion of the training program will be conducted, the learning environment modeling the workplace of the customer where the team of employees will perform the service for the customer and providing a realistic environment within which to acquire the experience to perform the service for the customer by completing the performance objectives specifically determined for the training program, including:

assembling and connecting a collection of computer systems, including one or more servers and one or more workstations, in a manner that resembles computer systems of the customer that the team of employees is likely to encounter while performing the service for the customer at the customer's workplace and such that performance and operation of the assembled and connected collection of computer systems can be monitored, and arranging a layout of a physical office space in a manner that resembles physical working conditions that the team of employees is likely to encounter at the customer's workplace while performing the service for the customer;

based on the roles for the team of employees specifically determined for the training program, developing an instructional curriculum for the training program by:

creating a new performance objective matrix specifically for the training program, the performance objective matrix identifying the specifically determined roles for the team of employees during the training program, the specifically determined performance objectives for each role during the training program, and a time frame for accomplishing the specifically determined performance objectives during the training program, and using the performance objective matrix to create a learning event schedule that specifies one or more instructional activities to be performed in the learning environment specifically created for the training program by each role in order to complete the specifically determined performance objectives during the training program; and creating an evaluation plan specifically for the training program to gauge the progress of the roles towards completing the instructional activities during the training program, wherein the evaluation plan provides a measure that the roles have completed the instructional activities during the training program and have acquired the experience to perform the service for the customer in the compressed time period as a result of participating in the training program.

2. The method of claim 1 wherein the service for the customer is an enterprise application integration during which the team of employees will integrate disparate technical components at the customer's workplace into a common framework.

3. The method of claim 1 wherein:

creating a new performance objective matrix specifically for the training program includes rendering the performance objective in the form of a tangible spreadsheet; and creating a learning event schedule includes rendering the learning event schedule in a tangible form.

4. The method of claim 2 wherein developing creating a learning environment includes defining hardware systems and software systems needed for the training program.

5. The method of claim 1 wherein the performance objective matrix is a spreadsheet including:

a role column including at least one row for each role specifically determined for the team of employees during the training program;

a performance objective column including specifically determined performance objectives corresponding to roles in the role column; and an activity column identifying instructional activities to be performed by each role specifically determined for the team of employees during the training program in order to meet a corresponding performance objective.

6. The method of claim 5 wherein the performance objective matrix further includes:

a pre-read column indicating whether a corresponding performance objective may be met through a pre-reading assignment; and an other material column indicating whether a corresponding performance objective may be met through an assignment of other material.

7. The method of claim 6 wherein the assignment of other material includes a web-based learning assignment.

8. A compressed experiential learning system for providing a training program to a team of employees before the team of employees performs a service for a customer at the customer's worksite, the compressed experiential learning system comprising:

roles specifically selected for members of the team of employees during the training program, wherein:

each role is to be performed by a member of the team of employees in order to accomplish one or more performance goals of the training program, the one or more performance goals representing goals to be accomplished by the team of employees in order to acquire experience to perform the service for the customer in a compressed time period that is shorter than a time period in which the experience is acquired without using the training program, and each role corresponds to a position to be filled while performing the service for the customer;

a learning environment created specifically for the training program and within which at least a portion of the training program is conducted, the learning environment modeling the worksite of the customer where the team of employees will perform the service for the customer and providing a realistic environment within which to acquire the experience to perform the service for the customer by completing the performance goals, the learning environment including:

technical components including one or more servers and one or more workstations assembled and connected in a manner that simulates the computer systems of the customer with which the team of employees will be expected to interact with while performing the service for the customer at the customer's worksite, a control server configured to monitor performance and operation of the technical components of the learning environment, and a physical office space that models physical working conditions that the team of employees is likely to encounter at the customer's worksite while performing the service for the customer, the physical office space being laid out in a manner that resembles a layout of the customer's worksite and including furniture and equipment that resembles furniture and equipment at the customer's worksite;

a learning event schedule created specifically for the training program using a performance objective matrix, wherein:

the performance objective matrix is specific to the training program and identifies the performance goals to be accomplished by each role during the training program as well as one or more learning activities that are designed to be performed in the learning environment created specifically for the training program to assist the roles in meeting the performance goals, and the learning event schedule specifies learning activities to be performed in the learning environment created specifically for the training program by each role during the training program and one or more times during the training program at which the instructional activities are to be performed by the roles;

an evaluation plan to gauge the performance of the members of the team of employees in completing the learning activities during the training program, wherein the evaluation plan provides a measure that the roles have completed the learning activities and have acquired the experience to perform the service for the customer in the compressed time period as a result of using the training program.

9. The system of claim 8 wherein the roles specifically selected for members of the team of employees during the training program include one or more from the group consisting of:
a project manager;
a technology architect;
a process architect;
a physical environment architect;
an application designer; and
an application developer.

10. The system of claim 8 wherein the service for the customer is an enterprise application integration during which the team of employees will integrate disparate computer systems at the customer's worksite into a common framework.

11. The system of claim 8 wherein the learning environment includes hardware systems and software systems used to carry out the training program.

12. The system of claim 8 wherein the performance objective matrix is a spreadsheet including:
a role column including at least one row for each role;
a performance objective column including performance goals corresponding to roles in the role column; and
an activity column identifying activities to be performed in the learning environment to meet a corresponding performance goal.

13. The system of claim 12 wherein the performance objective matrix further includes:
a pre-read column indicating whether a corresponding performance goal may be met through a pre-reading assignment; and
an other material column indicating whether a corresponding performance goal may be met through an assignment of other material.

14. The system of claim 13 wherein the assignment of other material includes a web-based learning assignment.

15. The method of claim 1 wherein developing the learning environment comprises identifying technical and physical components to be included in the learning environment.

16. The method of claim 1 wherein creating the evaluation plan specifically for the training program comprises creating an evaluation plan that indicates additional instructional activities to be completed by the roles to acquire the experience to perform the service for the customer.

17. The system of claim 8 wherein the evaluation plan indicates additional learning activities to be completed by the roles to acquire the experience to perform the service for the customer.

18. A method for developing a compressed experiential training program to be administered to a team of employees that includes one or more members before the team of employees performs an enterprise application integration service for a client customer at the customer's worksite during which the team of employees will integrate disparate technical components including one or more servers and one or more workstations at the client's worksite into a common framework, the method comprising:

determining high-level goals specifically for the compressed experiential training program, the specific high-level goals representing goals to be accomplished by the team of employees during the compressed experiential training program in preparation for performing the enterprise application integration service for the customer;

establishing roles for the members of the team of employees specifically for the compressed experiential learning program, wherein each role is to be performed by a member of the team of employees and corresponds to a position to be filled while performing the enterprise application integration service for the customer;

determining performance objectives for each role specifically for the compressed experiential training program, each of the performance objectives specifically determined for the compressed experiential training program to be completed by one or more roles in order for the team of employees to accomplish the high-level goals specifically determined for the compressed experiential training program;

based on the high-level goals specifically determined for the compressed experiential training program and the roles for the members of the team of employees specifically determined for the compressed experiential learning program creating a learning environment specifically for the compressed experiential training program and within which at least a portion of the compressed experiential training program will be conducted, the learning environment providing a simulation setting for the team of employees to acquire experience to perform the enterprise application integration service for the customer, including:

assembling and connecting technical components including one or more servers and one or more workstations that simulate the disparate technical components at the customer's worksite that the team of employees will be expected to integrate into a common framework while performing the enterprise application, integration service for the customer at the customer's worksite, and arranging a layout of physical components including office space, furniture, and equipment to model working conditions that may be experienced by the team of employees at the customer's worksite while performing the enterprise application; integration service at the customer's worksite;

based on the roles for the team of employees specifically determined for the compressed experiential training program, defining an instructional curriculum, wherein defining an instructional curriculum includes:

creating a new performance objective matrix specifically for the compressed experiential training program that identifies the roles for the members of the team of employees specifically determined for the compressed experiential training program, the specifically determined performance objectives for each role during the compressed experiential training program, and a time frame for accomplishing the specifically determined performance objectives during the compressed experiential training program, including creating a spreadsheet that includes:

a role column including at least one row for each role specifically determined for the compressed experiential training program, a performance objective column identifying the specifically determined performance objectives for each role during the compressed experiential training program, and an instructional activity column, the instructional activity column identifying one or more instructional activities designed to be performed in the learning environment specifically created for the compressed experiential training program to assist each role complete the role's specifically determined performance, objectives during the compressed experiential training program, and using the performance objective matrix to create an instructional activity schedule that specifies one or more instructional activities to be performed in the learning environment specifically created for the compressed experiential training program by each role; and creating an evaluation plan specifically for the compressed experiential training program for determining whether the performance objectives specifically determined for the compressed experiential training program are being completed during the compressed experiential training program.

* * * * *